(12) United States Patent
Lin et al.

(10) Patent No.: US 9,613,328 B2
(45) Date of Patent: Apr. 4, 2017

(54) WORKFLOW MONITORING AND ANALYSIS SYSTEM AND METHOD THEREOF

(71) Applicant: INDUSTRIAL TECHNOLOGY RESEARCH INSTITUTE, Hsinchu (TW)

(72) Inventors: Hung-Wei Lin, Chiayi County (TW); Hau-Wei Wang, Taipei County (TW); Shu-Ping Dong, Taichung County (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 671 days.

(21) Appl. No.: 13/900,905

(22) Filed: May 23, 2013

(65) Prior Publication Data

US 2014/0180743 A1    Jun. 26, 2014

(30) Foreign Application Priority Data

Dec. 21, 2012    (TW) ............................ 101149021 A (51) Int. Cl.
G06Q 50/18    (2012.01)
G06Q 10/06    (2012.01)

(52) U.S. Cl.
CPC ......................... G06Q 10/063114 (2013.01)

(58) Field of Classification Search
USPC ...................................................... 705/7.28
See application file for complete search history.

(56) References Cited

U.S. PATENT DOCUMENTS

| 5,423,554 A | 6/1995 | Davis |
| 5,454,043 A | 9/1995 | Freeman |
| 5,852,672 A * | 12/1998 | Lu ..................... G01B 11/2441 356/604 |

(Continued)

FOREIGN PATENT DOCUMENTS

| CN | 102053575 A | 5/2011 |
| JP | 10214346 | 11/1998 |

(Continued)

OTHER PUBLICATIONS

Kimura et al., "Task-model based human robot cooperation using vision", Proceedings of the 1999 IEEE/RSJ International Conference on Intelligent Robots and Systems, 1999, IEEE.*

(Continued)

Primary Examiner — Thomas L Mansfield, Jr.
(74) Attorney, Agent, or Firm — Locke Lord LLP; Tim Tingkang Xia, Esq.

(57) ABSTRACT

A method of workflow monitoring and analysis includes: according to an image to generate at least one three-dimensional joint coordinate, and according to the three dimensional joint coordinate to generate at least one task posture information; according to a movement information to generate at least one three-dimensional track information, and according to the three dimensional track to generate at least one task track information; and according to a workpiece posture information, the task posture information, a workpiece movement information and the task track information to generate a task semanticist.

12 Claims, 4 Drawing Sheets

(56) References Cited

U.S. PATENT DOCUMENTS

| | | |
|---|---|---|
| 5,875,108 A | 2/1999 | Hoffberg et al. |
| 6,128,003 A | 10/2000 | Smith et al. |
| 6,222,465 B1 | 4/2001 | Kumar et al. |
| 6,256,033 B1 | 7/2001 | Nguyen |
| 6,477,239 B1 | 11/2002 | Ohki et al. |
| 6,507,675 B1* | 1/2003 | Lee .............. G06K 9/00127 382/155 |
| 6,564,144 B1 | 5/2003 | Cherveny |
| 6,963,827 B1 | 11/2005 | Elyea et al. |
| 7,225,414 B1 | 5/2007 | Sharma et al. |
| 7,239,718 B2 | 7/2007 | Park et al. |
| 7,353,082 B2 | 4/2008 | Pretlove et al. |
| 7,402,743 B2 | 7/2008 | Clark et al. |
| 7,565,295 B1 | 7/2009 | Hernandez-Rebollar |
| 7,606,411 B2 | 10/2009 | Venetsky et al. |
| 7,853,041 B2 | 12/2010 | Shamaie |
| 8,139,110 B2 | 3/2012 | Nishihara |
| 9,318,108 B2* | 4/2016 | Gruber et al. ....... G10L 15/1815 |
| 2003/0219704 A1 | 11/2003 | Bleckley et al. |
| 2004/0057619 A1* | 3/2004 | Lim .................. G06K 9/033 382/182 |
| 2005/0234310 A1* | 10/2005 | Alwan ............... A61B 5/0002 600/300 |
| 2005/0256611 A1 | 11/2005 | Pretlove et al. |
| 2006/0143034 A1 | 6/2006 | Rothermel et al. |
| 2007/0219738 A1 | 9/2007 | Weiher et al. |
| 2008/0004904 A1* | 1/2008 | Tran ................... A61B 5/0006 705/2 |
| 2008/0044084 A1* | 2/2008 | Lee ..................... G06T 5/00 382/190 |
| 2008/0247506 A1* | 10/2008 | Maschke .............. A61B 6/12 378/15 |
| 2009/0006172 A1 | 1/2009 | Singh et al. |
| 2009/0173779 A1 | 7/2009 | Szesko et al. |
| 2010/0194679 A1 | 8/2010 | Wu et al. |
| 2010/0194744 A1* | 8/2010 | Glueck et al. ......... G06T 15/20 345/419 |
| 2010/0234994 A1 | 9/2010 | Shi |
| 2011/0026833 A1 | 2/2011 | Sugino et al. |
| 2011/0270123 A1* | 11/2011 | Reiner ................. A61B 6/463 600/558 |
| 2011/0274311 A1 | 11/2011 | Lee et al. |
| 2011/0295399 A1 | 12/2011 | Plociennik et al. |
| 2012/0062725 A1 | 3/2012 | Wampler, II et al. |
| 2013/0218340 A1* | 8/2013 | Hager .................. B25J 9/1671 700/257 |
| 2014/0300722 A1* | 10/2014 | Garcia ................ G06T 7/602 348/77 |

FOREIGN PATENT DOCUMENTS

| | | |
|---|---|---|
| JP | 2006099158 A | 4/2006 |
| TW | 393629 B | 6/2000 |
| TW | I281024 B | 5/2007 |
| TW | 201009766 A | 3/2010 |
| TW | 201030630 A | 8/2010 |
| TW | 201203131 A | 1/2012 |
| TW | M443156 U1 | 12/2012 |

OTHER PUBLICATIONS

Lambrecht et al., Markerless Gesture-Based Motion Control and Programming of Industrial Robots, Emerging Technologies & Factory Automation (ETFA), 2011 IEEE 16th Conference, 2011, pp. 1-4.

Chen, Realization of Finger Recognition on Virtual Mouse Application, Institute of Industrial Design of National Yunlin University of Science & Technology, 2010.

Fernandez-Y-Fernandez et al, Integrated Development Environment Gesture for modeling workflow diagrams, Congreso Internacional de Investigación e Innovación en Ingenieria de Software, 2012, pp. 1-8, Guadalajara, Jalisco, del 25 al 27 de abril.

Kimura et al., Task-Model Based Human Robot Cooperation Using Vision, Intelligent Robots and Systems, 1999. IROS '99. Proceedings, 1999 IEEE/RSJ International Conference, 1999, pp. 701-706, vol. 2.

Chen, Application of Mixture of Experts Model to Sign Language Gesture Recognition, Southern Taiwan University Of Science and Technology, 2010.

Che-Wei Liu et al., Static Hand Posture Recognition Based on an Implicit Shape Model, Department of Electrical Engineering College of Electrical Engineering and Computer Science, National Taiwan University Master Thesis, 2010, Taiwan.

Wen-Hui Chen et al., A Generic Framework for the Design of Visual-based Gesture Control Interface, 5th IEEE Conference on Industrial Electronics and Applicationsis, 2010, p. 1522-1525.

Yu, Intelligent Hand Gesture Recognition System Design Based On Hand Contour, 2010.

Intellectual Property Office, Ministry of Economic Affairs, R.O.C., "Office Action", Nov. 21, 2014, Taiwan.

* cited by examiner

WORKFLOW MONITORING AND ANALYSIS SYSTEM AND METHOD THEREOF

CROSS REFERENCE TO RELATED APPLICATION

This application also claims priority to Taiwan Patent Application No. 101149021 filed in the Taiwan Patent Office on Dec. 21, 2012, the entire content of which is incorporated herein by reference.

TECHNICAL FIELD

The present disclosure relates to a workflow monitoring and analysis system and method, and more particularly, to a method and system capable of generating a task syntagm to be used in a hybrid automation means.

BACKGROUND

With rapid advance of technology, there are more and more handheld electronic devices that are becoming available and commonly used in our daily lives, such as smart phones, tablet computers and notebook computers. Nevertheless, also because of their variety in design and style, many recent electronic devices can not be produced completely by an automation process, but still require plenty of manpower for assembly.

As a consequence, for increasing production and reducing cost, there are more and more studies in the industry trying to design a hybrid automation system capable of combining tasks that are needed to be accomplished accurately and rapidly and being executed by robots with tasks that are high complicated and needed to be performed by human into a same production line, and thereby, enjoying the benefic of both robotic assembly and manual assembly simultaneously.

However, in most workflows enabled in current hybrid automation systems there is no visual recognition apparatus being provided for monitoring the movement of both robots and human, whereas the movement of human operators are especially difficult to measure and quantified. In most cases, certain kinds of artificial intelligence will be needed just to identify the meaning of operator's hand movements, otherwise the workflow including alternating manual procedures and automated robotic procedures can not be performed smoothly. Therefore, it is in need of an improved workflow monitoring and analysis apparatus and method adapted for hybrid automation.

SUMMARY

In an exemplary embodiment, the present disclosure provides a workflow monitoring and analysis method, which comprises the steps of: generating at least one three-dimensional joint coordinate according to an image information so as to be used for generating at least one workpiece posture information accordingly, and further according to workpiece posture information to generate a task posture information; generating at least one three-dimensional track information according to a movement information so as to be used for generating at least one workpiece track information accordingly, and further according to the workpiece track information to generating a task track information; and generating a task syntagm according to the task posture information and the task track information.

In another exemplary embodiment, the present disclosure provides a workflow monitoring and analysis, which comprises: a detection module; at least one first image capturing module; at least one second image capturing module; and a workflow analysis unit, electrically and respectively coupled to the at least one first image capturing module and the at least one second image capturing module, and further comprised of: an image recognition module, a detection zone posture module, a detection zone movement module and a task model database; wherein, the at least one first image capturing module is used for capturing images of the detection module so as to generate an image information accordingly; the at least one second image capturing module is used for capturing movements of the detection module so as to generate a movement information accordingly; the image recognition module is used for identifying and recognizing the image information and the movement information; the detection zone posture module is used for receiving the image information to be used for generating at least one feature point accordingly; the detection zone movement module is provided for receiving the movement information so as to be used for generating at least one three-dimensional track information accordingly; the task model database is enabled to generate at least one task posture information according to the at least one feature point and is also being enabled to generate at least one task track information according to the at least one three-dimensional track information, and then according to the at least one task posture information and the at least one task track information, the workflow model database is enabled to generate a task syntagm.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
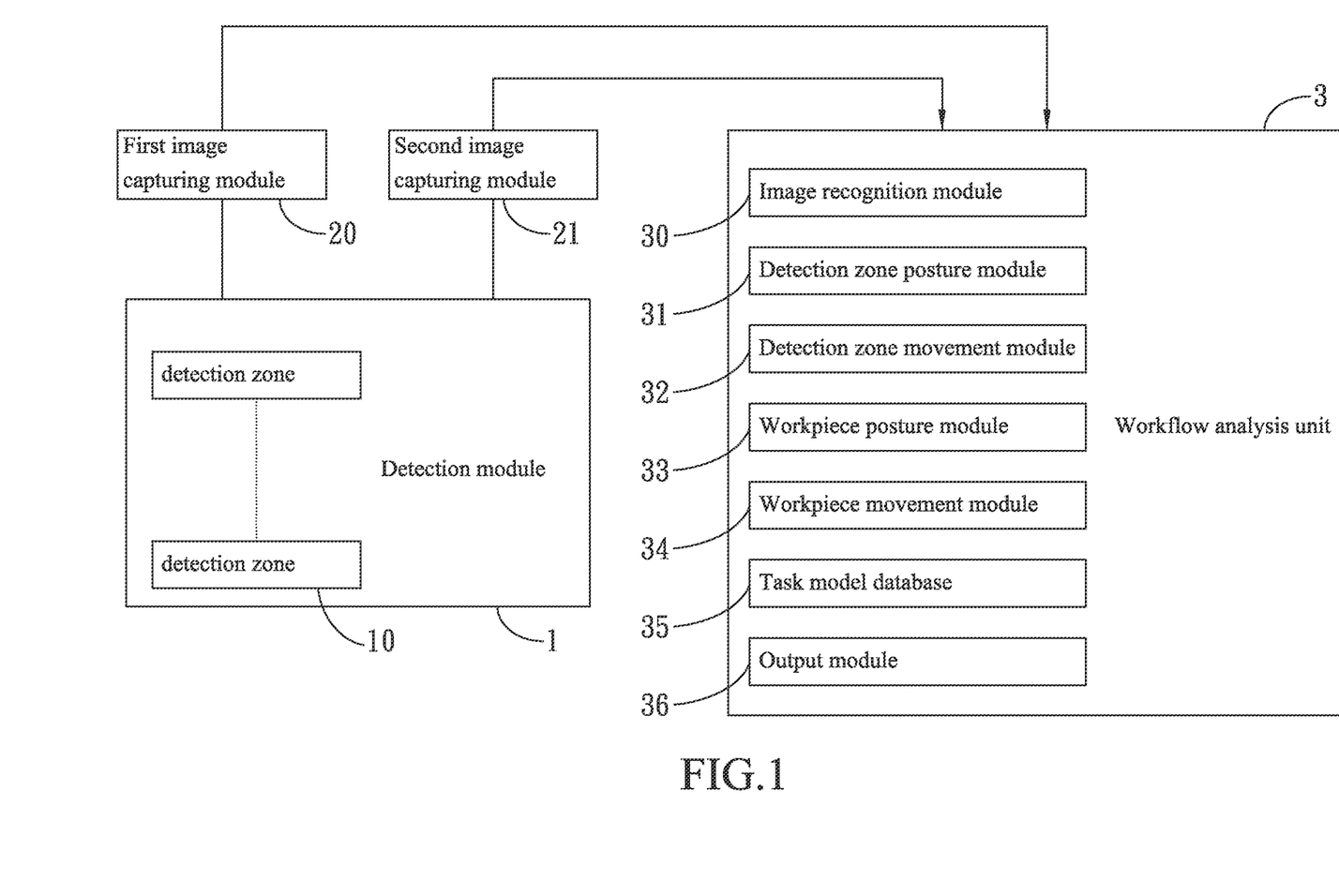
FIG. 1 is a schematic diagram showing a workflow monitoring and analysis apparatus according to an embodiment of the present disclosure.

Please refer to FIG. 1, which is a schematic diagram showing a workflow monitoring and analysis apparatus according to an embodiment of the present disclosure. As shown in FIG. 1, the workflow monitoring and analysis apparatus comprises: a detection module 1, at least one first image capturing module 20, at least one second image capturing module 21 and a workflow analysis unit 3. In an embodiment, the detection module 1 can be a wearable item formed with a plurality of detection zones 10 that can be worn on an operator or attached to an hand of the operator, such as a glove, but is not limited thereby. Moreover, each of the detection zones 10 on the glove can be an area filled with components selected from the group consisting of: colored regions, characters, patches, color blocks, blight spots, light-emitting units and reflective units, and the combination thereof, whichever is a feature capable of being detected by the image capturing module.

In addition, an exemplary first image capturing module 20 is a charge-coupled device (CCD), and there can be one or a plurality of such first image capturing modules 20 being installed in the apparatus of the present disclosure that are used for acquiring images of the detection module 1. One the other hand, the second image capturing module 21 can be a depth camera, such as an infrared camcorder or camera, and similarly there can be one or a plurality of such second image capturing modules 21 being installed in the apparatus of the present disclosure that are used for capturing image depth or moving track of the detection module 1

The workflow analysis unit 3. which is electrically and respectively coupled to the first image capturing module 20 and the second image capturing module 21, is composed of an image recognition module 30, a detection zone posture module 31, a detection zone movement module 32, a workpiece posture module 33, a workpiece movement module 34, a task model database 35 and an output module 36.

Wherein, the task model database 35 has a plurality of base shape information and a plurality of mid-level shape information registered therein. In an embodiment, the plural primitive shape information can include a number of primitive hand gestures that can be distinguished from one another by the extent of finger bending, whereas the mid-level shape information can include hand gestures of reversing palm for instance. However, each of those base shape information and mid-level shape information is composed of a plurality of three-dimensional joint coordinates.

Operationally, the first image capturing module 20 is enabled to acquire images of the detection module 1 so as to generate an image information; the second image capturing module 21 is enabled to capturing depth or movement of the detection module 1 so as to generate a movement information; the image recognition module 30 is used for identifying and recognizing the image information and the movement information; the detection zone posture module 31 is used for receiving the image information of the detection module 1 to be used for detecting and generating at least one feature point from the detection zones 10 accordingly, and then the detection zone posture module 31 is further being enabled to receive at least one primitive shape information from the task model database 35 to be used in a comparison with the feature point while consequently transmitting the comparison result to the task model database 35 for enabling the task model database 35 to perform the following procedures: acquiring a mid-level shape information according to the comparison result in a successive approximation approach manner; performing an angle calibration procedure upon the comparison result according to the mid-level shape information so as to generate an angle calibration result; generating at least one three-dimensional joint coordinate according to the angle calibration result; and generating at least one task posture information according to the at least one three-dimensional joint coordinate. Thereafter, the workpiece posture module 33 is enabled to generate at least one workpiece posture information according to the image information and then transmitting the workpiece posture information to the task model database 35.

Moreover, the detection zone movement module 34 is provided for receiving the movement information so as to be used for performing a measurement upon a region accordingly, and then the detection zone movement module 34 is enabled to generate at least one three-dimensional track information according to the aforesaid three-dimensional joint coordinate and the measurement result relating to the region. Thereafter, the workpiece movement module 34 is enabled to generate at least one workpiece track information according to the movement information and than transmitting the workpiece track information to the task model database 35. Thereby, the task model database 35 to generate at least one task track information according to the three-dimensional track information and is able to further define a task posture and a task track, and the like.

In addition; the task model database 35 is enabled to generate at least one task model data according to the task track, the task posture, the workpiece posture information and the workpiece track information so as to be used in the generating of the task syntagm according to the combination of more than one so-generated task model data. The task syntagm is used for recognizing and describing movements of an on-line operator, and can substantially a kind of makeup language. The task syntagm is outputted by the output module 36.

Figure 2:
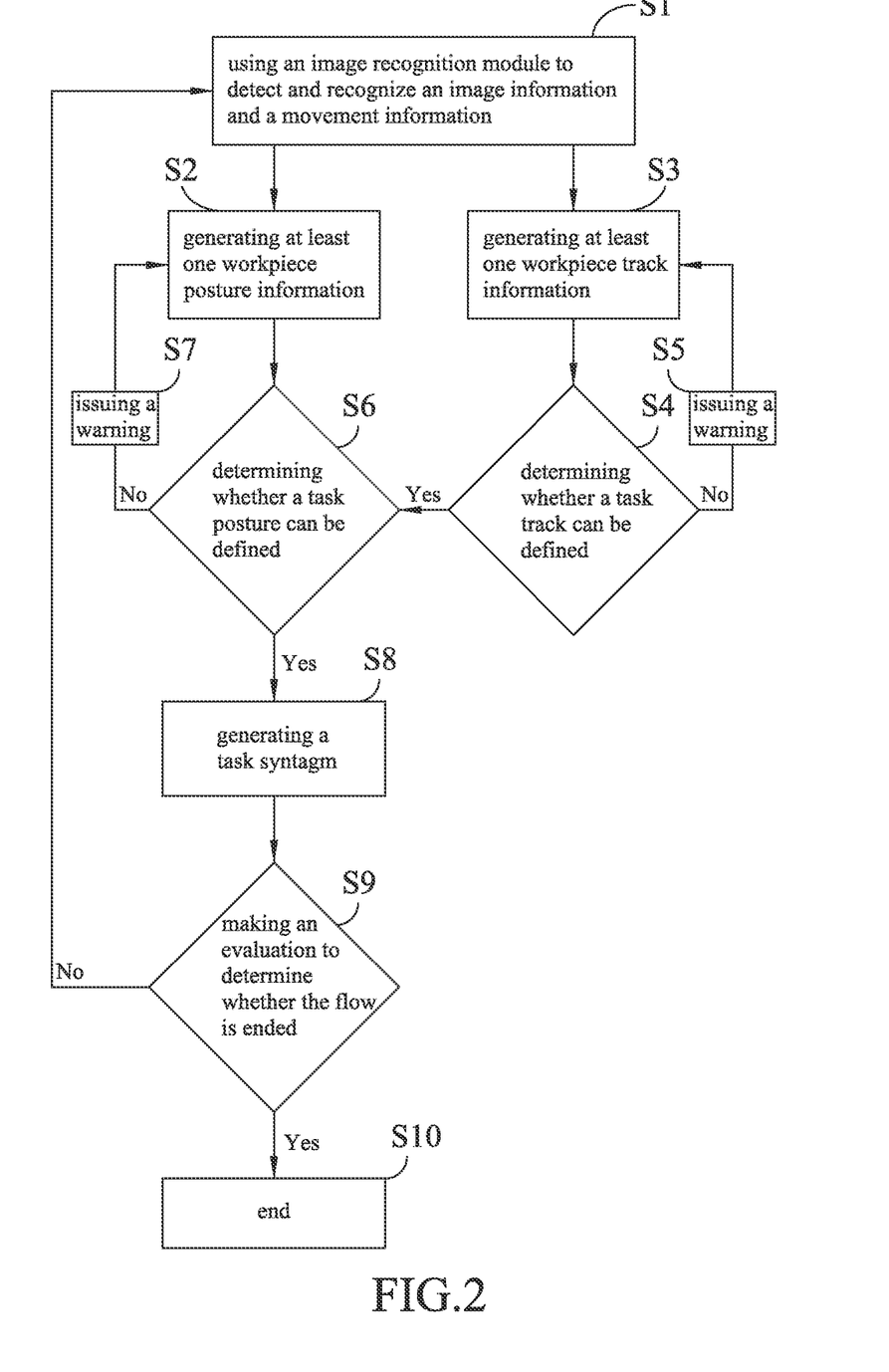
FIG. 2 is a flow chart depicting steps performed in a workflow monitoring and analysis method according to an embodiment of the present disclosure.

Please refer to FIG. 2, which is a flow chart depicting steps performed in a workflow monitoring and analysis method according to an embodiment of the present disclosure. As shown in FIG. 2, the workflow monitoring and analysis method starts from the step S1. At step S1, at least one first image recognition module 20 is used to detect and recognize a detection module 1 so as to generate an image information, whereas the image information can be a color image information, while simultaneously at least one second image capturing module 21 is used for capturing the movement of the detection module so as to generate a movement information accordingly, and then the flow proceeds to step S2 and S3 in respective. At step S2, a workpiece posture module 33 is enabled to generate at least one workpiece posture information according to the image information of S1, and then the flow proceeds to step S6. At step S3, a workpiece movement module 34 is used for generating at least one workpiece movement information according to the movement information of S1, and then the flow proceeds to step S4. At step S4, an evaluation is made for determining whether a task track can be defined, whereas the determination is made by a task model database 35 according to task track information stored therein, if not, the flow proceeds to step S5 for issuing a warning and then proceeds back to step S3, otherwise the flow proceeds to step S6. At step S6, an evaluation is made for determining whether a task posture can be defined, whereas the determination is made by a task model database 35 according to task posture information stored therein and the task track defined in step S4; if not the flow proceeds to step S7 for issuing a warning and then back to step S2, otherwise, the flow proceeds to step S8. It is noted that the warning of S5 and S7 can be a warning sound, a warning light or a warning signal. At step S8, the task model database 35 is enabled to generate a task model information according to the task posture information of S6, the task track information of S4, the workpiece posture information of S2, and the workpiece track information of S3 while enabling the generated task model information to be stored in the task model database 35, and then the task model database 35 combined more than one such task model information so as to generate a task syntagm, and then the flow proceeds to step S9. At step S9, an evaluation is made to determine whether the flow ends, if so, the flow proceeds to step 10 for ending, otherwise, the flow proceeds to back to step S1 while enabling the task syntagm to be outputted by an output module 36.

Figure 3:
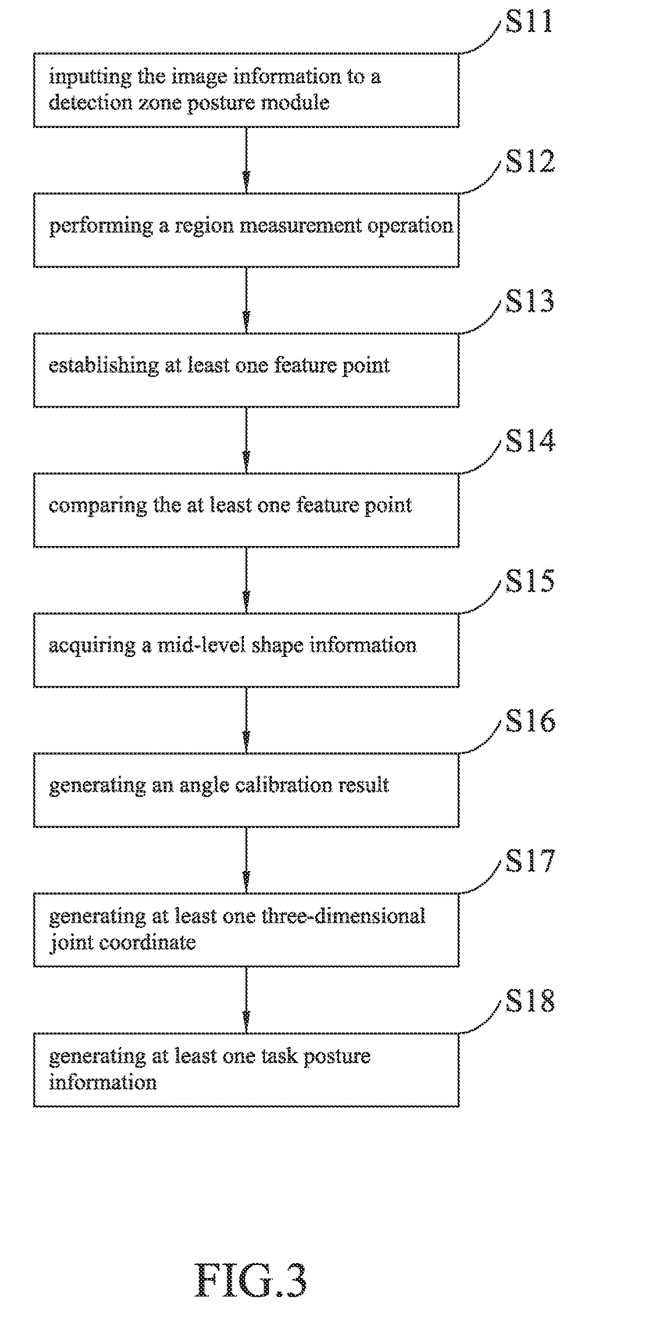
FIG. 3 is a flow chart depicting steps performed for generating a three-dimensional joint coordinate and a task posture information in the present disclosure.

In an embodiment, a detection zone posture module 31 is used to perform a comparison upon the image information of S1 so as to generate at least one three-dimensional joint coordinate accordingly, and thereby, the at least one three-dimensional joint coordinate is used in the generation of at least one task posture information. Please refer to FIG. 3, which is a flow chart depicting steps performed for generating a three-dimensional joint coordinate and a task posture information in the present disclosure. As shown in FIG. 3, the generating of a three-dimensional joint coordinate and a task posture information comprises the following steps:

S11: the image information is inputted into a detection zone posture module 31;

S12: a region measurement operation is performed by the detection zone posture module 31 according to the image information, whereas when the detection module 1 is a glove that is worn on a hand, the region measurement operation is a measurement performed on an area where the hand is moving;

S13: the detection zone module 31 is enabled to acquire at least one feature point out of the detection zones 10 in the image information, and in an embodiment, there can be 20 to 60 feature points, whereas each of the feature points can be established using a color distribution analysis means to determine whether the colors in the detection zones 10 are included in a color histogram that is stored in the task model database 35 and if so, the detection zones are identified as target regions to be used for establishing feature points;

S14: the task model database 35 is enabled to provide at least one primitive data to the detection zone posture module 31, and then the detection zone posture module 31 compares the at least one primitive data with the feature points so as to generate and transmit a comparison result to the task model database 35, in that the comparison is a similarity test comparing the orientations and positions between the feature points of the image information to those of the primitive data, and in an embodiment, if an image geometrical distance between the feature point of the image information and the related feature point of the primitive data is shorter than a specific distance, the similarity between the image information to the primitive data can be established, and moreover, the image geometrical distance is defined to be the Euclidean distance between two feature points, that is the real distance between two points in a space;

S15: the task model database 35 is enabled to acquire a mid-level shape information according to the comparison result in a successive approximation approach manner;

S16: the task model database 35 is enabled to perform an angle calibration procedure upon the comparison result according to the mid-level shape information so as to generate an angle calibration result;

S17: the task model database 35 is enabled to generate at least one three-dimensional joint coordinate according to the angle calibration result; and S18: the task model database 35 is enabled to generate at least one task posture information according to the at least one three-dimensional joint coordinate while enabling the at least one three-dimensional joint coordinate to be stored in the task model database 35.

Figure 4:
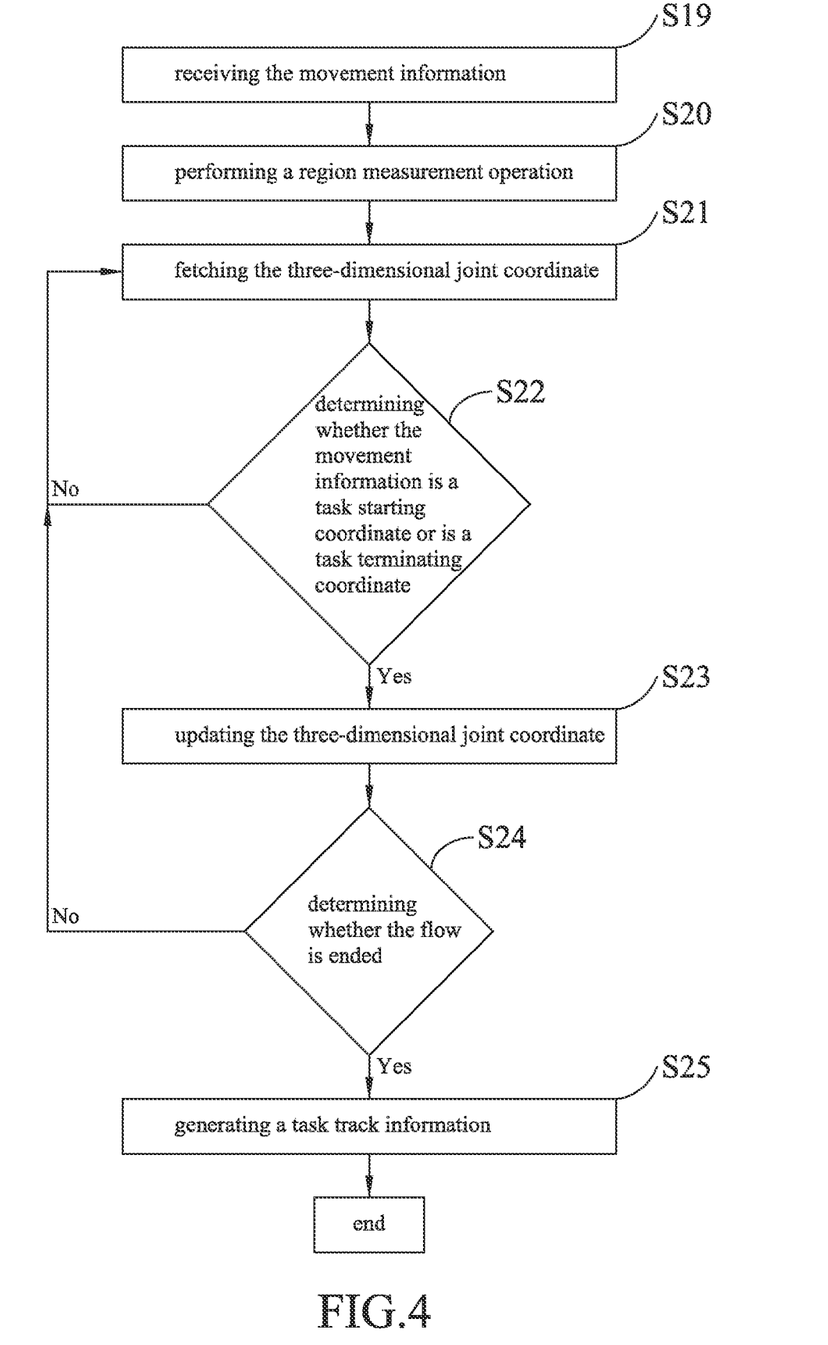
FIG. 4 is a flow chart depicting steps performed for generating a three-dimensional track information and a task track information in the present disclosure.

In addition, in an embodiment, a detection zone movement module 32 is used to generate at least one three-dimensional track information according to the movement information, and thereby, the at least one three-dimensional track information is used in the generation of at least one task track information. Please refer to FIG. 4, which is a flow chart depicting steps performed for generating a three-dimensional track information and a task track information in the present disclosure. As shown in FIG. 3, the generating of a three-dimensional track information and a task track information comprises the following steps:

S19: the detection zone movement module 32 is enabled to receive the movement information of S1;

S20: the detection zone movement module 32 is enabled to perform a region measurement operation according to the movement information;

S21: the detection zone movement module 32 is enabled to fetch the three-dimensional joint coordinate of S2 according to the measurement result;

S22: an evaluation is made by the detection zone movement module 32 according to the three-dimensional joint coordinate to determine whether the movement information is a task starting coordinate or is a task terminating coordinate, and if it is determined to be either the task starting coordinate or the task terminating coordinate, a three-dimensional track information is generated accordingly and the flow proceeds to step 23, otherwise, the flow proceeds back to step 21 for the fetching of the three-dimensional joint coordinate; and moreover, the three-dimensional track information includes actions and the time stamps of those actions and thereby, the exact action and position of the detection module 1 at the time t can be identified;

S23: the detection zone movement module 32 is enabled to fetch another three-dimensional joint coordinate for updating the same, and then the flow proceeds back to step 21 for repeating;

S24: an evaluation is made to determine whether the flow is ended, and if so, the flow proceeds to step 25 for enabling the task model database 35 to generate a task track information according to the three-dimensional track information while allowing the task track information to be stored in the task model database 35; otherwise, the flow proceeds back to step S21.

To sum up, the present disclosure provides a method and apparatus for detecting postures and movements of a detection module, and then strengthening the semantic accuracy of movement recognition and correctness of movement identification through the use of a posture reconstruction technique, so as to generate a task syntagm accordingly.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A workflow monitoring and analysis method, comprising the steps of:
    detecting, by a first image capturing module, at least one feature of at least one detection zone of a detection material, wherein the first image capturing module is a charge-coupled device (CCD);
    generating, by the first image capturing module, an image information according to the at least one feature being detected;
    generating, by a task model database, at least one three-dimensional joint coordinate according to the image information;
    generating, by the task model database, at least one task posture information according to the at least one three dimensional joint coordinate;
    generating, by a workpiece posture module, a workpiece posture information according to the image information;
    capturing, by a second image capturing module, movements of the detection material, wherein the second image capturing module is a depth camera;
    generating, by the second image capturing module, a movement information according to the movements of the detection material;
    generating, by a detection zone movement module, at least one three-dimensional track information according to the movement information of the detection material;
    generating, by a workpiece movement module, at least one workpiece track information according to the movement information of the detection material;
    generating, by the task model database, a task track information according to the three-dimensional track information;
    generating, by the task model database, a task semantics according to the task posture information and the task track information; and
    outputting, by an output module, the task semantics for use in a hybrid automation device.

2. The method of claim 1, wherein the image information is a color image information.

3. The method of claim 1, wherein the movement information is acquired using a depth camera.

4. The method of claim 1, wherein the three-dimensional joint coordinate and the task posture information are generated by the step of:
    inputting, by an image recognition module, the image information to the detection zone posture module;
    performing, by the detection zone posture module, a measurement upon a region according to the image information;
    establishing, by the detection zone posture module, at least one feature point according to the image information;
    comparing, by the detection zone posture module, the at least one feature point with a primitive data and outputting, by the detection zone posture module, a comparison result to the task model database;
    acquiring a mid-level shape information, by the task model database, according to the comparison result in a successive approximation approach manner;
    performing, by the task model database, an angle calibration procedure upon the comparison result according to the mid-level shape information and generating an angle calibration result;
    generating, by the task model database, the at least one three-dimensional joint coordinate according to the angle calibration result; and
    generating, by the task model database, the at least one task posture information according to the at least one three-dimensional joint coordinate.

5. The method of claim 4, wherein the at least one feature point is established by determining, through a color distribution analysis, the feature point is in a color histogram and the feature point is a target region.

6. The method of claim 4, wherein the comparison result is determined based upon a geometric distance between the feature point and an image of the primitive data.

7. The method of claim 1, wherein the three-dimensional track information and the task track information are generated by the steps of:
    receiving, by the detection zone movement module, the movement information of the detection material;
    performing, by the detection zone movement module, a measurement upon a region according to the movement information and consequently generating a measurement result;
    fetching, by the detection zone movement module, the three-dimensional joint coordinate according to the measurement result;
    according to the three-dimensional joint coordinate, in response to determining, by the detection zone movement module, the movement information is one of a task starting coordinate and a task terminating coordinate, generating a three-dimensional track information, and
    in response to determining, by the detection zone movement module, the movement information is not one of the task starting coordinate and the task terminating coordinate, proceeding back to the fetching of the three-dimensional joint coordinate;
    updating, by the detection zone movement module, the three-dimensional joint coordinate and then repeating the fetching step;
    making an evaluation to determine whether the process is ended; and
    in response to determining that the process is ended, generating a task track information according to the three-dimensional track information.

8. The method of claim 1, further comprising:
    according to the workpiece track information,
    in response to determining, by the task model database, that a task track is
    definable, continuing to determine, by the task model database, the definability of a task posture, and
    in response to determining, by the task model database, the task track is not definable, issuing a warning and proceeding back to the generating of at least one workpiece track information;
    according to the task track information and the workpiece posture information,
    in response to determining, by the task model database, the task posture is definable, issuing, by the task model database, a warning and proceeding back to the generating of at least one workpiece posture information, and
    in response to determining, by the task model database, that a task posture is not definable, generating, by the task model database, the task semantics;

generating, by the task model database, at least one task model data according to the task posture, the workpiece posture information and the workpiece track information; and generating, by the task model database, the task semantics according to the at least one task model data.

9. A workflow monitoring and analysis system, comprising:
- a detection material;
- at least one first image capturing module;
- at least one second image capturing module; and
- a workflow analysis unit, electrically and respectively coupled to the at least one first image capturing module and the at least one second image capturing module, and comprises
- an image recognition module,
- a detection zone posture module,
- a detection zone movement module,
- an output module, and
- a task model database;

wherein the at least one first image capturing module is configured to
- detect at least one feature of at least one detection zone of the detection material,
- generate an image information according to the detected at least one feature, and
- send the image information to the image recognition module;

wherein the at least one second image capturing module is configured to
- capture movements of the detection material,
- generate a movement information according to the movements of the detection material, and
- send the movement information to the image recognition module;

wherein the image recognition module is configured to
- receive the image information from the first image capturing module and the movement information from the second image capturing module,
- recognize the image information and the movement information,
- send the recognized image information to the detection zone posture module, and
- send movement information to the detection zone movement module;

wherein the detection zone posture module is configured to
- receive the image information from the image recognition module,
- generate at least one feature point according to the image information, and
- send the at least one feature point to the task model database;

wherein the detection zone movement module is configured to
- receive the movement information from the image recognition module,
- generate at least one three-dimensional track information according to the movement information, and
- send the at least one three-dimensional track information to the task model database;

wherein the task model database is configured to
receive the at least one feature point from the detection zone posture module and the at least one three-dimensional track information from the detection zone movement module,
generate at least one task posture information according to the at least one feature point,
generate at least one task track information according to the at least one three-dimensional track information, and
generate a task semantics according to the at least one task posture information and the at least one task track information, and wherein the output module is configured to output the task semantics for use in a hybrid automation device; and wherein the first image capturing module is a charge-coupled device (CCD) and the second image capturing module is a depth camera.

10. The system of claim 9, wherein the workflow analysis unit includes a workpiece posture module, and a workpiece movement module.

11. The system of claim 9, wherein each of the detection zones is an area filled with components selected from the group consisting of: colored regions, characters, patches, color blocks, blight spots, light-emitting units and reflective units, and the combination thereof.

12. The system of claim 9, wherein the detection material is a glove.

* * * * *